United States Patent
Pryadkin et al.

(10) Patent No.: US 8,143,763 B2
(45) Date of Patent: Mar. 27, 2012

(54) LINEAR PIEZOELECTRIC NANO-POSITIONER

(75) Inventors: Sergiy Pryadkin, Troy, MI (US);
Zhouhang Wang, Troy, MI (US);
Gennady Royzenblat, Troy, MI (US);
Xun Pan, Troy, MI (US)

(73) Assignee: RHK Technology, Inc., Troy, MI (US)

( * ) Notice: Subject to any disclaimer, the term of this patent is extended or adjusted under 35 U.S.C. 154(b) by 242 days.

(21) Appl. No.: 12/474,619

(22) Filed: May 29, 2009

(65) Prior Publication Data

US 2010/0301710 A1  Dec. 2, 2010

(51) Int. Cl.
*H01L 41/08* (2006.01)

(52) U.S. Cl. .................... 310/328; 310/323.02

(58) Field of Classification Search ............. 310/323.02, 310/328
See application file for complete search history.

(56) References Cited

U.S. PATENT DOCUMENTS

| | | | |
|---|---|---|---|
| 4,019,073 A | 4/1977 | Vishnevsky et al. | |
| 4,171,159 A | 10/1979 | White | |
| 4,727,278 A | 2/1988 | Staufenberg, Jr. et al. | |
| 4,766,311 A | 8/1988 | Seiler et al. | |
| 4,928,030 A | 5/1990 | Culp | |
| 4,959,552 A | 9/1990 | Saffert et al. | |
| 4,975,614 A | 12/1990 | Honda | |
| 4,987,526 A | 1/1991 | Slocum et al. | |
| 4,992,728 A | 2/1991 | McCord et al. | |
| 4,999,495 A | 3/1991 | Miyata et al. | |
| 5,051,646 A | 9/1991 | Elings et al. | |
| 5,083,022 A | 1/1992 | Miyamoto et al. | |
| 5,191,688 A * | 3/1993 | Takizawa et al. | ............ 29/25.35 |
| 5,196,745 A | 3/1993 | Trumper | |
| 5,237,238 A | 8/1993 | Berghaus et al. | |
| 5,569,918 A | 10/1996 | Wang | |
| 5,696,431 A * | 12/1997 | Giannopoulos et al. | ...... 315/308 |
| 6,765,335 B2 * | 7/2004 | Wischnewskiy | ......... 310/323.02 |
| 6,936,951 B1 * | 8/2005 | Cheng et al. | .................... 310/311 |
| 2005/0035687 A1 * | 2/2005 | Xu et al. | ...................... 310/328 |
| 2010/0115671 A1 | 5/2010 | Pryadkin et al. | |
| 2010/0148629 A1 * | 6/2010 | Bexell et al. | ............. 310/323.02 |
| 2011/0037348 A1 * | 2/2011 | Sakamoto | ................ 310/323.02 |

FOREIGN PATENT DOCUMENTS

WO    WO 93/19494    9/1993

OTHER PUBLICATIONS

PI Datasheet/Details: P-363 PicoCube High-Speed, XY(Z) Piezo Stages for Nanotechnology, SPM, AFM. Mar. 19, 2008 www.physikinstrumente.com/en/products/prdetail.php?sortnr=201650.
Vorndran, Stefan "Nanopositioning Stage Pulls Piconewtons in Molecular Stretching Application"; Dec./Jan. 2005; "Photonics Tech Briefs" EuroPhotonics Magazine; Laurin Publishing.
"XYZ 3-axis Nano-manipulator/prober"; Brochure; Unsoku Scientific Instruments; S20090320.
Brochure, UNISOKU Scientific Instruments, XYZ 3-axis, Nano-manipulator/prober UNISOKU Co., Ltd.

* cited by examiner

*Primary Examiner* — Mark Budd
(74) *Attorney, Agent, or Firm* — Reising Ethington P.C.

(57) ABSTRACT

A linear piezoelectric nano-positioner includes an armature configured to be translated along a longitudinal axis and having oppositely-disposed bearing surfaces and oppositely-disposed piezo surfaces, bearing sets engaged with the bearing surfaces of the armature to translatably support the armature, and piezoelectric elements engaged with the piezo surfaces of the armature to translate the armature along the longitude axis.

34 Claims, 8 Drawing Sheets

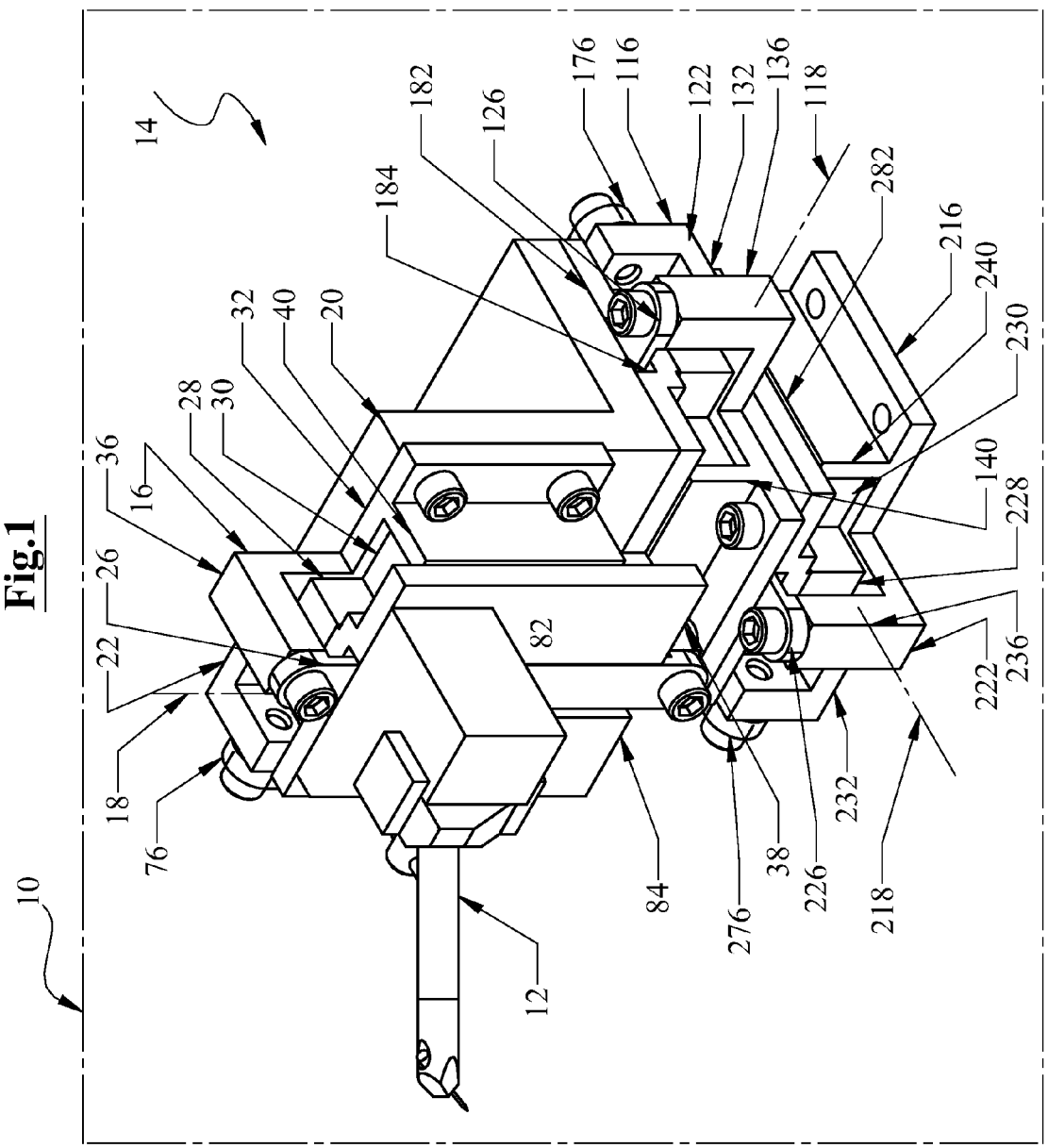

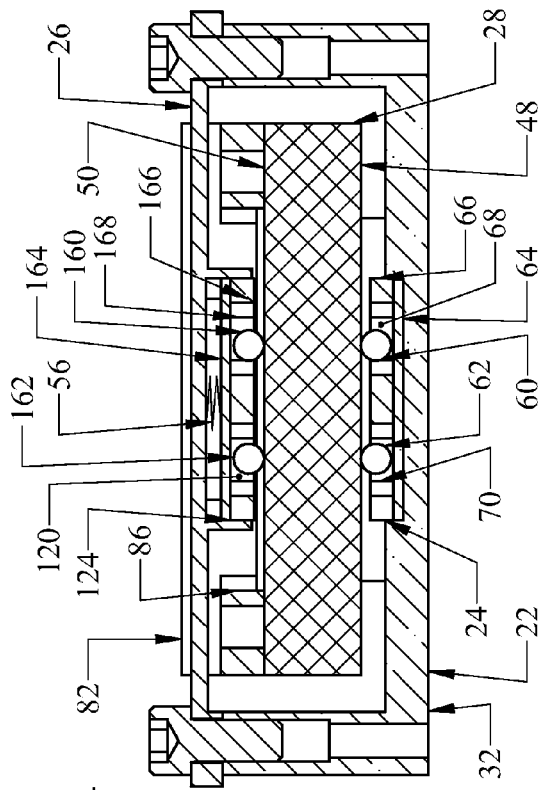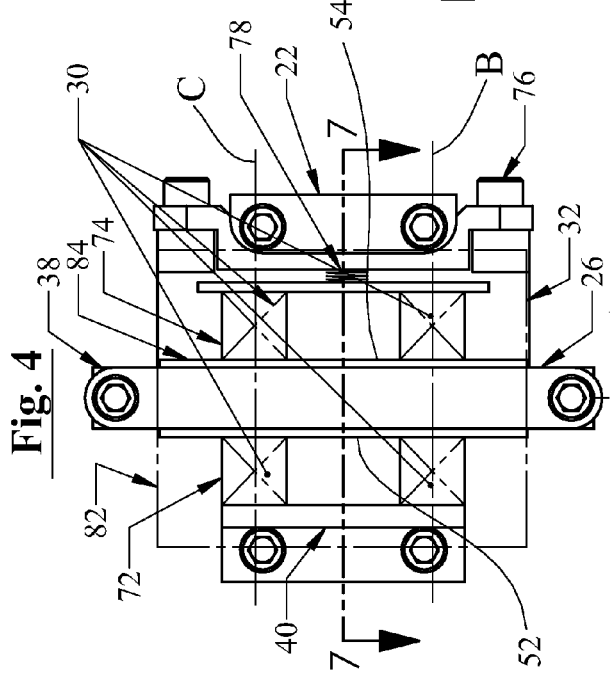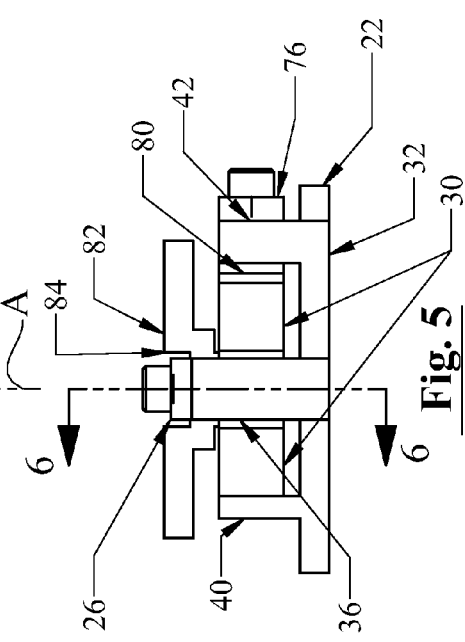

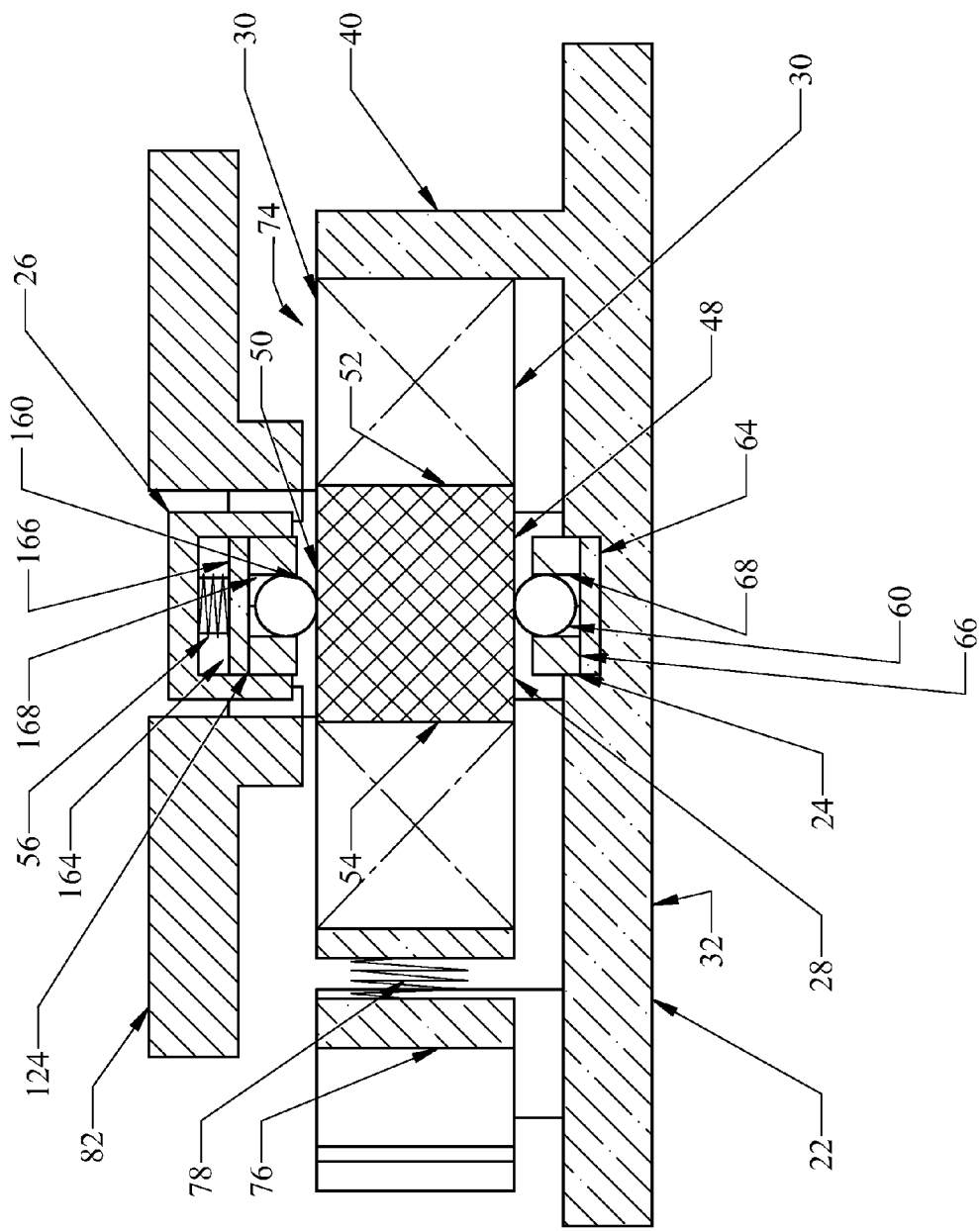

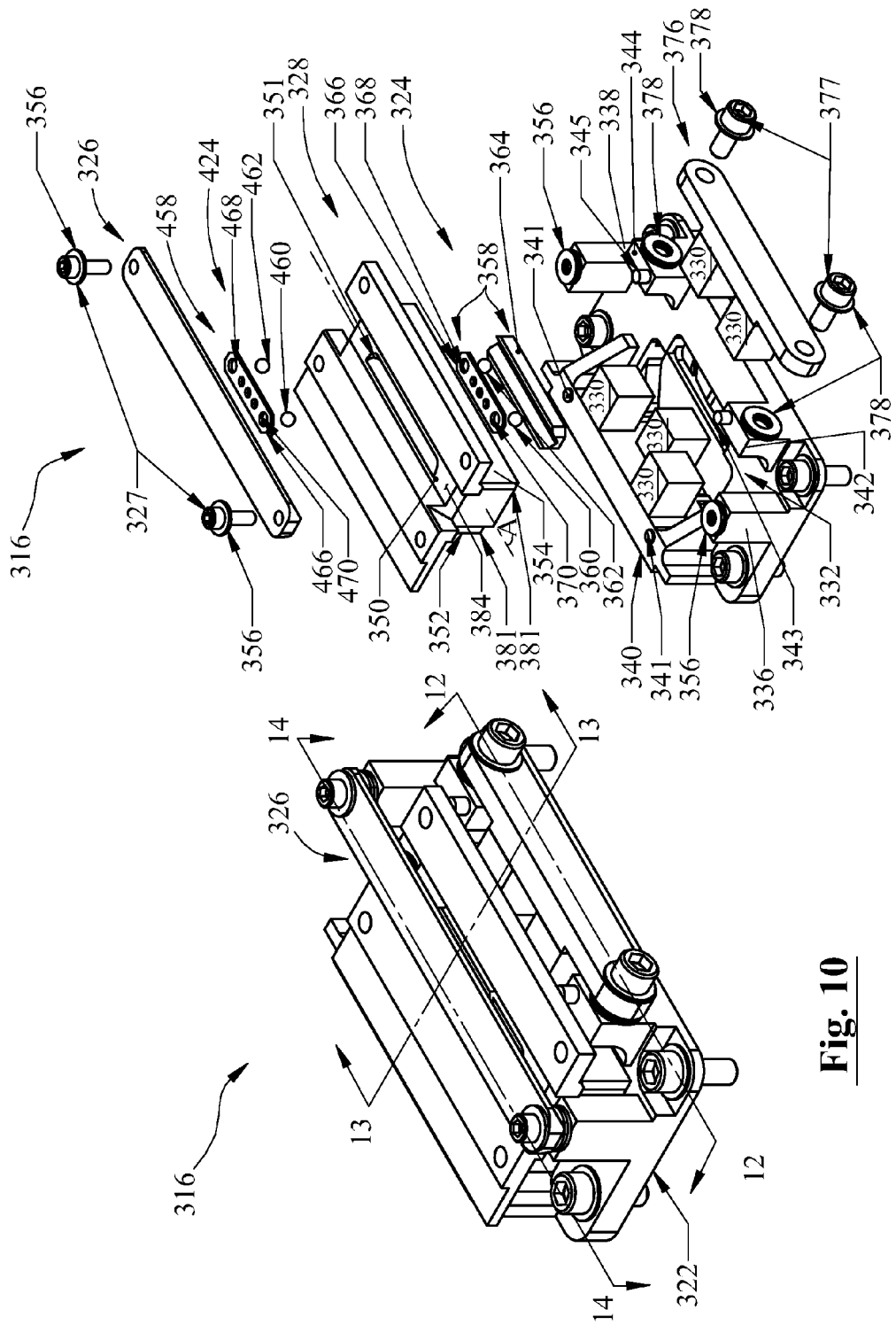

LINEAR PIEZOELECTRIC NANO-POSITIONER

TECHNICAL FIELD

This disclosure relates generally to electro-mechanical machines and, more particularly, to linear piezoelectric motors or nano-positioners.

BACKGROUND

Piezoelectric nano-positioners typically include piezoelectric elements that respond to electric pulses or fields by making a series of stretches and position holds (sticks) and contractions (slips) to drive a driven member in an incremental stepping or "stick-slip" manner. Linear piezoelectric nano-positioners are used in a wide variety of devices, for example, scanning probe microscopes (SPMs) used in the nanotechnology field. Scientists use SPMs to reveal data about various properties of materials, such as gold or silicon, at very fine resolution, down to molecules and atoms of the materials. SPMs are a family of ultra-high magnification instruments that include Scanning Tunneling Microscopes (STMs), Atomic Force Microscopes (AFMs), Near Field Scanning Optical Microscopes (NSOMs), among others. SPMs typically include piezoelectric nano-positioners that move physical probes with sufficient precision to provide ultra-high resolution on the nanometer scale and below.

But SPMs usually include a plurality of bulky piezoelectric nano-positioners that are separate for each of three X, Y, and Z machine axes and are distributed in different locations throughout the machine. Also, for many applications existing piezoelectric nano-positioners are not sufficiently rigid, or exhibit undesirable magnetic properties.

BRIEF SUMMARY

One exemplary embodiment includes a linear piezoelectric nano-positioner including a base, and an armature configured to be translated with respect to the base along a longitudinal axis. A first bearing set is disposed between the base and the armature to translatably support the armature with respect to the base, and a bearing clamp is coupled to the base to movably secure the armature and the first bearing set with respect to the base. A second bearing set is disposed between the bearing clamp and the armature to translatably support the armature with respect to the bearing clamp and is movably secured with respect to the base by the bearing clamp. At least one bearing spring yieldably biases at least one of the first or second bearing sets against the armature in a first bias direction. A first set of piezoelectric elements is disposed between the base and the armature to translate the armature with respect to the base, and a piezo clamp is coupled to the base to movably secure the armature and the first set of piezoelectric elements with respect to the base. A second set of piezoelectric elements is disposed between the piezo clamp and the armature to translate the armature with respect to the base and is movably secured with respect to the base by the piezo clamp.

In accordance with another exemplary embodiment, a linear piezoelectric nano-positioner includes an armature configured to be translated along a longitudinal axis and having oppositely-disposed bearing surfaces and oppositely-disposed piezo surfaces. The nano-positioner also includes bearing sets engaged with the oppositely-disposed bearing surfaces of the armature to translatably support the armature, and piezoelectric elements engaged with the oppositely-disposed piezo surfaces of the armature to translate the armature along the longitudinal axis.

In accordance with a further exemplary embodiment, a linear piezoelectric nano-positioner includes a base including a seat section having a bearing pocket, a first leg portion extending from one end of the seat section, a second leg portion extending from another end of the seat section, a clamp flange extending from one side of the seat section, a third leg portion extending from one end of another side of the seat section, and a fourth leg portion extending from another end of the other side of the seat section. The nano-positioner also includes an armature configured to be translated with respect to the base along a longitudinal axis, and having a first surface, a second surface oppositely-disposed with respect to the first surface, a third surface, and a fourth surface oppositely disposed with respect to the third surface and orthogonal to the first and second surfaces. A first bearing set is disposed in the bearing pocket of the base and in engagement with the first surface of the armature to translatably support the armature with respect to the base, and a bearing clamp is coupled to the first and second leg portions of the base to movably secure the armature and the first bearing set with respect to the base. A second bearing set is disposed between the bearing clamp and in engagement with the second surface of the armature to translatably support the armature with respect to the bearing clamp, and is movably secured with respect to the base by the bearing clamp. At least one bearing spring yieldably biases at least one of the first or second bearing sets against the armature in a first bias direction. A first set of piezoelectric elements is disposed between the clamp flange of the base and the third surface of the armature to translate the armature with respect to the base, and a piezo clamp is coupled to the third and fourth leg portions of the base to movably secure the armature and the first set of piezoelectric elements with respect to the base. A second set of piezoelectric elements is disposed between the piezo clamp and the fourth surface of the armature to translate the armature with respect to the base and is movably secured with respect to the base by the piezo clamp.

In accordance with yet another exemplary embodiment, a multi-axis piezoelectric system includes a first linear piezoelectric nano-positioner to move along a first longitudinal axis, and a second linear piezoelectric nano-positioner coupled to the first linear piezoelectric nano-positioner to move along a second longitudinal axis offset with respect to the first longitudinal axis. Each of the first and second linear piezoelectric nano-positioners includes an armature configured to be translated along a longitudinal axis and having oppositely-disposed bearing surfaces and oppositely-disposed piezo surfaces, bearing sets engaged with the bearing surfaces of the armature to translatably support the armature, and piezoelectric elements engaged with the piezo surfaces of the armature to translate the armature along the longitudinal axis. A third linear piezoelectric nano-positioner may be coupled to the second linear piezoelectric nano-positioner to move along a third longitudinal axis offset from the first and second longitudinal axes.

BRIEF DESCRIPTION OF THE DRAWINGS

Features and advantages of one or more of the disclosed embodiments of this disclosure will be apparent to those of ordinary skill in the art from the following detailed description of exemplary embodiments and the claims, with reference to the accompanying drawings in which:

FIG. 1 is a perspective view of a multi-axis piezoelectric system for a microscope according to one exemplary embodiment;

FIG. 4 is a top plan view of the linear piezoelectric nano-positioner of FIG. 2;

FIG. 5 is an end elevational view of the linear piezoelectric nano-positioner of FIG. 2;

FIG. 6 is a cross-sectional view of the linear piezoelectric nano-positioner of FIG. 5 as taken along line 6-6;

FIG. 7 is a cross-sectional view of the linear piezoelectric nano-positioner of FIG. 4 as taken along line 7-7;

FIG. 10 is a perspective view of another linear piezoelectric nano-positioner according to another exemplary embodiment;

FIG. 11 is an exploded view of the linear piezoelectric nano-positioner of FIG. 10;

DETAILED DESCRIPTION OF PREFERRED EMBODIMENTS

Figure 3:
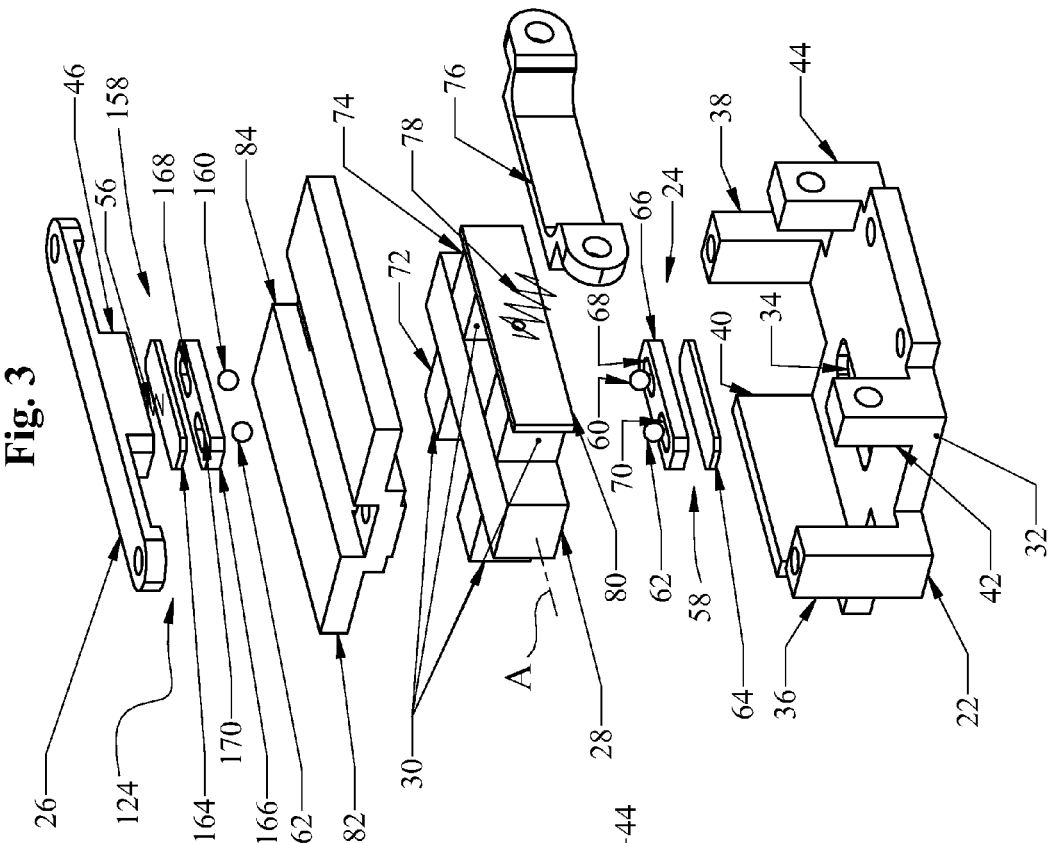
FIG. 3 is an exploded view of the linear piezoelectric nano-positioner of FIG. 2.
Figure 2:
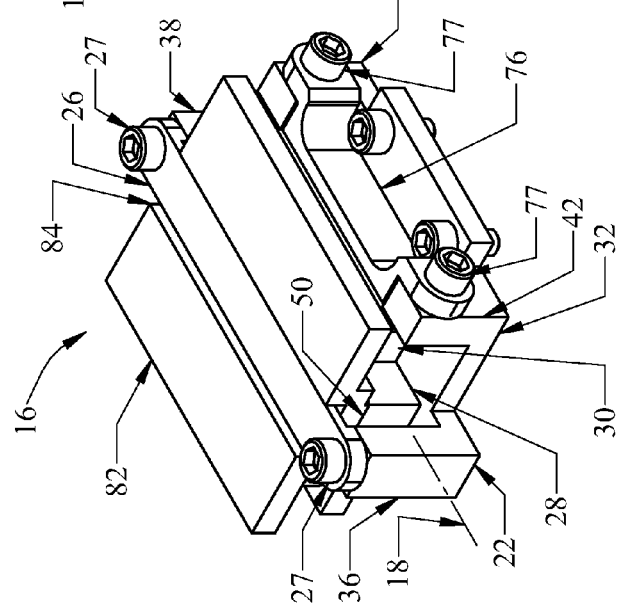
FIG. 2 is a perspective view of one linear piezoelectric nano-positioner of the multi-axis piezoelectric system of FIG. 1 according to one exemplary embodiment.

In general, a multi-axis piezoelectric system for a scanning probe microscope (SPM) will be described using one or more exemplary embodiments of a linear piezoelectric nano-positioner having one or more bearing sets for supporting an armature. The exemplary embodiment(s) will be described with reference to its use in SPMs. However, it will be appreciated as the description proceeds that the invention is useful in many different applications and may be implemented in many other embodiments.

Referring specifically to the drawings, FIG. 1 illustrates an exemplary embodiment of an SPM 10 having a probe 12 and a multi-axis piezoelectric system 14 for incrementally positioning the probe 12 on the nanometer scale and below. It is contemplated that the multi-axis piezoelectric system 14 instead may be a scanning and manipulation tool for other suitable portions of the SPM 10, or an atomic force microscope or scanning tunnel microscope and may be used for various other known nanotechnology applications.

The multi-axis piezoelectric system 14 includes first, second and third piezoelectric devices that may be linear piezoelectric nano-positioners 16, 116, 216 operably associated to each other for moving the probe 12 along first, second and third longitudinal axes 18, 118, 218. The first linear piezoelectric nano-positioner 16 is coupled to the probe 12 in any suitable manner to move the probe 12 along the first longitudinal axis 18. The second linear piezoelectric nano-positioner 116 is coupled to the first linear piezoelectric nano-positioner 16 in any suitable manner, for example, by a bracket 20, to move the probe 12 along the second longitudinal axis 118, which is offset from the first longitudinal axis 18. The third linear piezoelectric nano-positioner 216 is coupled to the second linear piezoelectric nano-positioner 116 in any suitable manner to move the probe 12 along the third longitudinal axis 218, which is offset from the first and second axes 18, 118. In this embodiment, the first, second and third longitudinal axes 18, 118, 218 are orthogonal with respect to each other and may be referred to as the Z, Y and X axes respectively. Nevertheless, the first, second and third axes can be offset from each other by various suitable angles.

The first, second and third linear piezoelectric nano-positioners 16, 116, 216 may be substantially similar to each other. Accordingly, only the first linear piezoelectric nano-positioner 16 will be discussed in detail below.

As shown in FIGS. 2-7, the first linear piezoelectric nano-positioner 16 may include a base 22 that may be used to carry other components of the device 16, an armature 28 translatable with respect to the base 22 along a longitudinal axis A, and a mounting plate 82 that may be carried by the armature 28 to mount the device 16 to some other device. The linear piezoelectric nano-positioner 16 may also include a first clamp or bearing clamp 26 that may be used to secure the armature 28 to the base 22 in a first direction, and a second clamp or piezo clamp 76 that may be used to secure the armature 28 to the base 22 in a second direction orthogonal to the first direction. The linear piezoelectric nano-positioner 16 may additionally include bearing sets 24, 124 that may be disposed between the base 22 and the armature 28 and between the bearing clamp 26 and the armature 28, respectively. The linear piezoelectric nano-positioner 16 may also include a first spring or bearing spring 56 to yieldably bias one or both of the bearing sets 24, 124 against the armature 28 in a first bias direction. The linear piezoelectric nano-positioner 16 may further include piezoelectric elements 30 disposed between the piezo clamp 76 and the armature 28 and between the armature 28 and the base 22. Finally, the linear piezoelectric nano-positioner 16 may include one or more second springs or piezo springs 78 that may be structurally located between the piezoelectric elements 30 and the piezo clamp 76 and operably disposed between the base 22 and the piezoelectric elements 30 to yieldably bias one or more of the piezoelectric elements 30 with respect to the armature 28 in a second bias direction.

The base 22 may include a seat section 32 having a first seat 34 to receive the first bearing set 24. In another embodiment, the base 22 may not include the first seat 34, and the first bearing set 24 may instead be mounted to any suitable portion of the base 22. The seat 34 may be a pocket provided in the base 22. As detailed below, the base 22 further includes a first leg portion 36 that may extend from one end portion of the seat section 32 and a second leg portion 38 that may extend from another end portion of the seat section 32. In addition, the base 22 may include a clamp flange 40 that may extend from one side portion of the seat section 32 and third and fourth leg portions 42, 44 that may extend from opposed ends of another side portion of the seat section 32. In the illustrated embodiment, the leg portions, 36, 38, 42, 44 and the clamp flange 40 may be integral with the seat section 32. In other embodiments, one or more of the leg portions, 36, 38, 42, 44 or the clamp flange 40 may be coupled to the seat section 32 in any suitable manner, for example, by fastening, welding, staking, etc.

The bearing clamp 26 may be coupled to the base 22 to movably secure the armature 28 and the first bearing set 24 with respect to the base 22. As used herein the terminology "bearing clamp" distinguishes clamp 26 from clamp 76 and is not meant to imply that the clamp 26 actually has bearings in the clamp. The bearing clamp 26 may have a second seat 46 for receiving the second bearing set 124. In another embodiment, the bearing clamp 26 may not include the second seat 46, and the second bearing set 124 instead may be mounted to any suitable surface of the bearing clamp 26. The seat 46 may include a pocket provided in the device 26. The bearing clamp 26 may have a pair of opposing end portions that may be coupled to a respective one of the first and second leg portions 36, 38 of the base 22 in any suitable manner, for example by fastening, welding, staking, etc. In one exemplary embodiment, the bearing clamp 26 may be fastened to the base 22 with fasteners 27, for instance, socket head cap screws as shown in the figures, or by bolts, or any other suitable fastening components. However, other suitable portions of the bearing clamp 26 may be associated with various portions of the base 22 as desired.

The armature 28 may be in the form of an elongated member and may have oppositely-disposed bearing surfaces and oppositely-disposed piezo surfaces. For example, the armature 28 may have first, second, third, and fourth orthogonal surfaces 48, 50, 52, 54. For example, the second surface 50 is oppositely-disposed with respect to the first surface 48, and the fourth surface 54 is oppositely-disposed with respect to the third surface 52 such that the first and second surfaces 48, 50 are perpendicularly disposed with respect to the third and fourth surfaces 52, 54. The first and second surfaces 48, 50 may be engaged with and supported by the first and second bearing sets 24, 124, respectively. The third and fourth surfaces 52, 54 may be engaged with the piezoelectric elements 30. The armature 28 is translatably secured to the base 22 and is axially translatable along the base 22 and the first longitudinal axis 18 of the device 16. As used herein, the terminology "translatably secured" includes being secured in such a manner that translational motion is possible. In another embodiment, the armature 28 may instead have a cylindrical shape in normal cross section with four orthogonal flats to provide the surfaces, or may have other suitable shapes with various surfaces for supporting bearing sets. For example, in another embodiment, the armature may be cylindrical and the bearing sets may be configured to support corresponding orthogonal cylindrical surfaces of the armature in any suitable manner.

The first bearing set 24 may be disposed between the base 22 and the armature 28 to translatably support the armature with respect to the base 22. The first bearing set 24 may include a frame 58 and one or more roller elements, for example, a pair of roller elements 60, 62. The frame 58 may include a plate 64 and a retainer 66 supported by the base 22. For example, the plate 64 and the retainer 66 may be received within the first seat 34 of the base 22, wherein the retainer 66 may be fixed against translation by the base 22. The retainer 66 may have a height or thickness and one or more apertures 68, 70 extending therethrough and corresponding to the roller elements 60, 62. (Directional words such as front, rear, top, bottom, upper, lower, radial, circumferential, axial, lateral, longitudinal, vertical, horizontal, transverse, height, width, and the like are employed herein by way of description and not limitation.) The apertures 68, 70 may be slots as shown, or may be of any other suitable shape. The roller elements 60, 62 may be disposed in the apertures 68, 70 and may have a cross-sectional thickness greater than a corresponding height of the retainer 66. Accordingly, the roller elements 60, 62 may extend through the apertures 68, 70 for supporting the armature 28. In this respect, the roller elements 60, 62 may move from one end portion of the respective apertures 68, 70 to another end portion of the apertures 68, 70. In addition, the roller elements 60, 62 may include balls, rods, or any other suitable rollable elements or any combination thereof. In one implementation, the roller elements 60, 62 may be tungsten carbide balls.

The second bearing set 124 may be disposed between the bearing clamp 26 and the armature 28 to translatably support the armature 28 with respect to the bearing clamp 26 and may be movably secured with respect to the base by the bearing clamp. As used herein, the terminology "movably secured" includes being secured in such a manner that motion is possible. The second bearing set 124 may have a frame 158 and a pair of roller elements 160, 162 and may be substantially similar to the first bearing set 24 having the frame 58 and roller elements 60, 62, respectively. However, this frame 158 may include a plate 164 and a retaining member 166 received within the second seat 46 of the bearing clamp 26 instead of the first seat 34 of the base 22.

The first or second bearing sets 24, 124 or both instead may have frames that are unitary pieces. The bearing(s) may include more or less than two roller elements and more or less than two apertures. Aside from roller elements, the bearing sets 24, 124 may have sliding elements or various other suitable bearing elements. As used herein, the terminology bearing set includes a plurality of components to support longitudinal motion of the armature 28.

The bearing spring 56 may be disposed between the bearing clamp 26 and the second bearing set 124 to yieldably bias the armature 28 with respect to the bearing clamp 26 and, ultimately, with respect to the base. As used herein, the term spring includes any suitable component or device to yieldably bias the armature 28 and may include one or more coil springs, leaf springs, spring washers, accordion springs, elastomeric members, or any other suitable component(s).

The piezoelectric elements 30 may include sets of piezoelectric elements ("piezo sets") to translate the armature 28 with respect to the base 22, and may be movably secured with respect to the base by the piezo clamp 76. The piezoelectric elements 30 may be associated with the third and fourth surfaces 52, 54 of the armature 28 for moving the armature 28 axially along the base 22 in response to receiving an electric pulse or field. Those of ordinary skill in the art will recognize that electric pulses are typically used for coarse movement of such armatures and, in contrast, electric fields are usually used for fine movement. The piezo sets may include a first set or pair of piezoelectric elements 72 that may be disposed between the base 22 and the armature 28, for example, in engagement with the third surface 52 of the armature 28. The piezo sets may also include a second set or pair of piezoelectric elements 74 that may be disposed between the piezo clamp 76 and the armature 28, for example, in engagement with the fourth surface 54 of the armature 28. The first and second pairs 72, 74 may be spaced apart and aligned along spaced apart axes B, C transverse to the longitudinal axis A. The piezoelectric elements 30 instead may include more or less than four piezoelectric elements positioned in a variety of suitable arrangements with respect to the armature 28. The piezoelectric elements 30 may be produced from PZT-8 lead zirconate titanate plates available from EBL Products, Inc. of East Hartford, Conn.

The piezo clamp 76 may be coupled to the base 22 to movably secure the armature 28 and the piezoelectric elements 74 with respect to the base 22. As used herein the terminology "piezo clamp" distinguishes clamp 76 from clamp 26 and is not meant to imply that the clamp 76 actually has piezos in the clamp. The piezo clamp 76 and the piezo spring 78 may be associated with a piezoelectric element carrier 80 for securing the armature 28 in the base 22 and engaging the piezoelectric elements 30 to the armature 28. The piezo clamp 76 may have opposing end portions coupled to the third and fourth leg portions 42, 44 of the base 22 in any suitable manner, for example, by fastening, welding, staking, etc. In one exemplary embodiment, the piezo clamp 76 may be fastened to the base 22 with fasteners 77, for instance, socket head cap screws as shown in the figures, or by bolts, or any other suitable fastening components. The piezo clamp 76 instead may be attached to other suitable portions of the base 22 as desired. The piezo spring 78 may be disposed between the piezo clamp 76 and the piezoelectric element carrier 80. The piezoelectric element carrier 80 is associated with the second pair of piezoelectric elements 74. Accordingly, the piezo spring 78 yieldably biases the armature 28 with respect to the piezo clamp 76 and, thus, with respect to the base 22 to which the clamp 76 is rigidly secured. In another embodiment, the linear piezoelectric nano-positioner 16 may not include the piezo clamp 76, the piezo spring 78 and the piezoelectric element carrier 80, and other suitable support structures can secure the armature 28 to the base 22. The piezoelectric elements 30 may be associated with the armature 28 using any suitable mounting configuration.

The mounting plate 82 associated with the armature 28 may have a clearance channel 84 for receiving the bearing clamp 26. The mounting plate 82 further includes an aperture 86 for receiving the second seat 46 of the bearing clamp 26. Accordingly, the armature 28 may translate the mounting plate 82 along the longitudinal axis 18 in response to the piezoelectric elements 30 moving the armature 28 on the first and second bearing sets 24, 124. In another embodiment, the mounting plate 82 and the armature 28 may be integrated into one unitary component.

Figure 9:
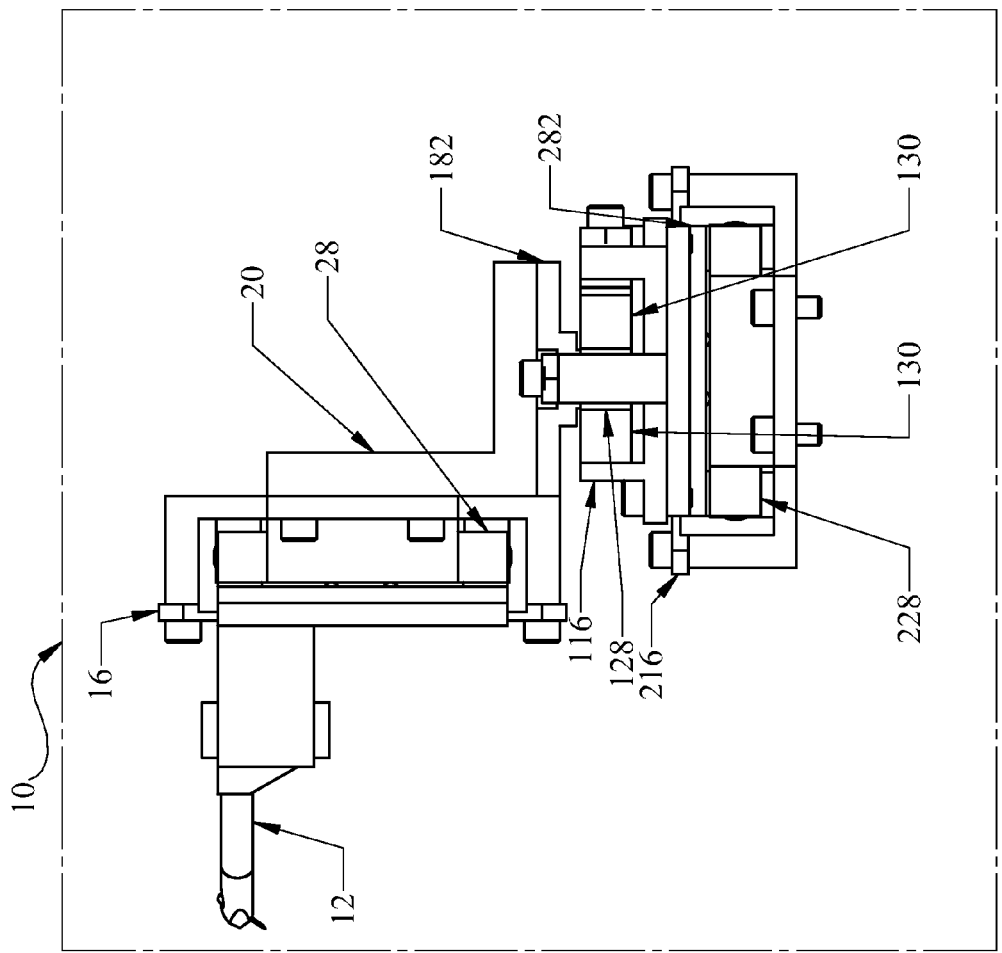
FIG. 9 is a side plan view of the piezoelectric system of FIG. 1.
Figure 8:
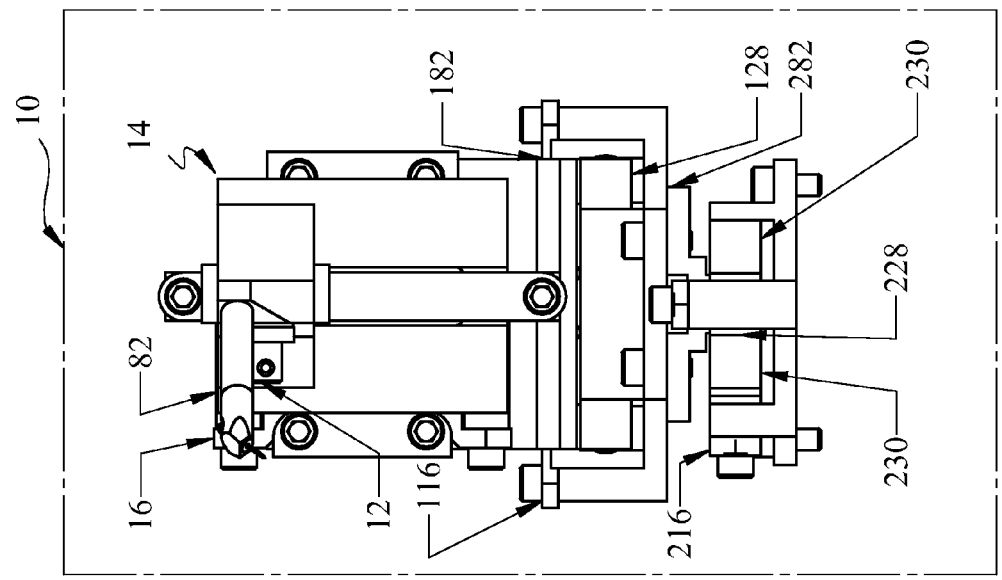
FIG. 8 is a front plan view of the piezoelectric system of FIG. 1.

Referring to FIGS. 1, 8 and 9, the piezoelectric system 14 may include the linear piezoelectric nano-positioners 16, 116, 216 for moving the probe 12 along the Z, Y, and X axes on the nanometer scale and below. However, the piezoelectric system 14 may move the probe 12 or other objects on any suitable scale of measurement.

The probe 12 may be associated with the mounting plate 82 of the first linear piezoelectric nano-positioner 16. The mounting plate 82 may be carried by the armature 28 that may be associated with piezoelectric elements 30. Accordingly, the first linear piezoelectric nano-positioner 16 may translate the probe 12 along the Z-axis in response to piezoelectric elements 30 receiving an electric pulse or field.

The base 22 or other suitable portion of the first linear piezoelectric nano-positioner 16 may be associated with the mounting plate 182 of the second linear piezoelectric nano-positioner 116 by the bracket 20 or other known support structure. The mounting plate 182 may be carried by the armature 128 that may be associated with piezo sets 130. Accordingly, the second linear piezoelectric nano-positioner 116 may translate the probe 12 along the Y-axis in response to piezo sets 130 receiving an electric pulse or field.

Similarly, the base 122 or other suitable portion of the second linear piezoelectric nano-positioner 116 may be associated with the mounting plate 282 of the third linear piezoelectric nano-positioner 216. The mounting plate 282 may be carried by the armature 228 that may be associated with piezo sets 230. Accordingly, the third linear piezoelectric nano-positioner 216 may translate the probe 12 along the X-axis in response to piezo sets 230 receiving an electric pulse or field.

FIGS. 10-14 illustrate another exemplary embodiment of a linear piezoelectric nano-positioner 316. This embodiment is similar in many respects to the embodiment of FIGS. 1-9 and like numerals between the embodiments generally designate like or corresponding elements throughout the several views of the drawing figures. Additionally, the descriptions of the embodiments are incorporated by reference into one another and the common subject matter generally may not be repeated here.

The linear piezoelectric nano-positioner 316 may include a base 322 that may be used to carry other components of the device 316, an armature 328 that may be in the form of an integrated elongated member portion and mounting plate portion that may be used to mount the device 316 to some other device. The linear piezoelectric nano-positioner 316 also may include a bearing clamp 326 that may be used to secure the armature 328 to the base 322 in a first direction, and a piezo clamp 376 that may be used to secure the armature 328 to the base 322 in another direction orthogonal to the first direction. The linear piezoelectric nano-positioner 316 additionally may include bearing sets 324, 424 that may be disposed between the base 322 and the armature 328 and between the bearing clamp 326 and the armature 328, respectively. The linear piezoelectric nano-positioner 316 also may include bearing springs 356 to yieldably bias the bearing set 424 against the armature 328. The linear piezoelectric nano-positioner 316 may further include piezoelectric element sets or "piezo sets" 330 disposed between the piezo clamp 376 and the armature 328 and between the armature 328 and the base 322. Finally, the linear piezoelectric nano-positioner 316 may include one or more piezo springs 378 that may be operably disposed between the base 322 and the second set of piezoelectric elements 374 to yieldably bias one or more of the piezo elements 330 against the armature 328.

Figure 13:
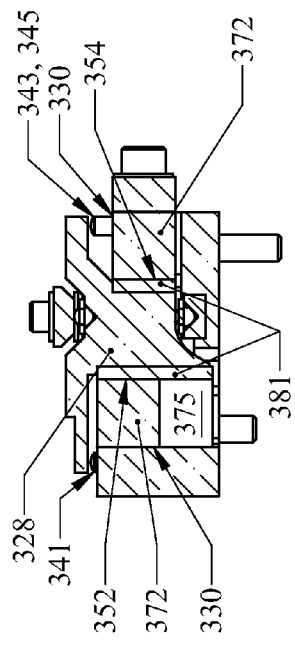
FIG. 13 is a cross-sectional elevational view of the linear piezoelectric nano-positioner of FIG. 10 as taken along line 13-13.

The base 322 may include a seat section 332 having a first seat 334 (FIG. 14) to receive the first bearing set 324. In another embodiment, the base 322 may not include the first seat 334, and the first bearing set 324 may instead be mounted to any suitable portion of the base 322. The seat 334 may be a pocket provided in the base 322, as best shown in FIG. 4. As detailed below, the base 322 further includes a first leg portion 336 that may extend from one end portion of the seat section 332 and a second leg portion 338 that may extend from another end portion of the seat section 332. In addition, the base 322 may include a clamp flange 340 that may extend from one side portion of the seat section 332 and third and fourth leg portions 342, 344 that may extend from opposed ends of another side portion of the seat section 332. Set screws 341, 343, 345 may be threaded into corresponding portions of the clamp flange 340, and leg portions 342, 344. As shown in FIG. 13, the set screws 341, 343, 345 may be used to provide support for corresponding flanges of the armature 328 to prevent damage to the positioner 316.

The bearing clamp 326 may or may not include a bearing seat, and the second bearing set 424 may engage a suitable corresponding surface of the bearing clamp 326. The bearing clamp 326 may have a pair of opposing end portions that may be coupled to a respective one of the first and second leg portions 336, 338 of the base 322 in any suitable manner, for example by fastening, welding, staking, etc. However, other suitable portions of the bearing clamp 326 may be associated with various portions of the base 322 as desired.

As shown in FIG. 11, plates 381 may be carried by the armature 328 between the armature 328 and the piezoelectric elements 330. The plates 381 may be adhered to, fastened to, or otherwise carried by the armature 328 in any suitable manner so that there is no relative motion therebetween. Whereas the armature 328 may be composed of titanium, the plates 381 may be composed of sapphire, ceramic, or any other material suitable for piezo stick-slip interaction.

The armature 328 may have a clearance channel 384 for receiving the bearing clamp 326, and also may have first, second, third, and fourth orthogonal surfaces 348, 350, 352, 354. For example, the second surface 350 is oppositely-disposed with respect to the first surface 348, and the fourth surface 354 is oppositely-disposed with respect to the third surface 352 such that the first and second surfaces 348, 350 are perpendicularly disposed with respect to the third and fourth surfaces 352, 354. The first and second surfaces 348, 350 may be engaged with and supported by the first and second bearing sets 324, 424, respectively. In one embodiment, the second surface 350 may be disposed within the clearance channel 384 and may include a bearing groove 351 for engagement with the second bearing set 424. For example, the bearing groove 351 may be V-shaped in normal cross section. The third and fourth surfaces 352, 354 may be engaged with the piezo sets 330. The armature 328 is translatably secured to the base 322 and is axially translatable along the base 322 along the longitudinal axis A thereof. In another embodiment, the armature 328 may instead have a cylindrical shape in normal cross section with four orthogonal flats, or may have other suitable shapes with various surfaces for supporting the bearing sets 324, 424.

Figure 14:
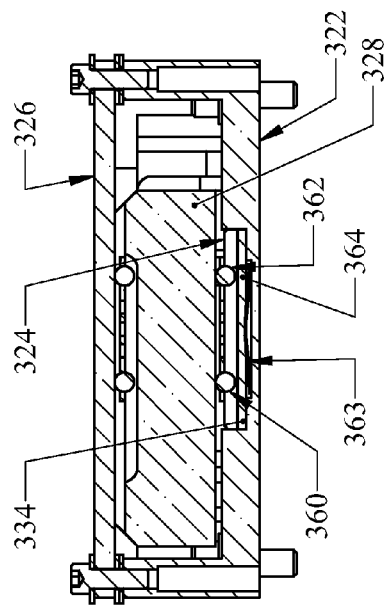
FIG. 14 is a cross-sectional elevational view of the linear piezoelectric nano-positioner of FIG. 10 as taken along line 14-14.

The first bearing set 324 may include a frame 358 and one or more roller elements, for example, a pair of roller elements 360, 362. The frame 358 may include a linear guide 364 and a retainer 366, which may be free to translate. The linear guide 364 may include a bearing groove V-shaped in normal cross section, may be received within the first seat 334 of the base 322, and may be configured to support the roller elements 360, 362. The retainer 366 may have a height or thickness and one or more apertures 368, 370 extending therethrough and corresponding to the roller elements 360, 362. The apertures 368, 370 may be holes as shown, or may be of any other suitable shape. The roller elements 360, 362 may be disposed in the apertures 368, 370 and may have a cross-sectional thickness greater than a corresponding height of the retainer 366. Accordingly, the roller elements 360, 362 may extend through the apertures 368, 370 for supporting the armature 328. In addition, the roller elements 360, 362 may be balls, rods, other suitable rolling devices or any combination thereof. As shown in FIG. 14, the first bearing set 324 may be yieldably biased between the base 322 and the armature 328 by a spring 363. The spring 363 maintains the roller elements 360 362 in contact with the armature 328 in the event of unseating, deflection or displacement of the armature 328 away from the first bearing set 324. The spring 363 may be a wave spring, as shown, or may include any other suitable shape and configuration.

Similarly, the second bearing set 424 may have a frame 458 and a pair of roller elements 460, 462 and may be substantially similar to the first bearing set 324 having the frame 358 and roller elements 360, 362, respectively. However, this frame 458 may include a retaining member 466 with apertures 468, 470.

Some of the bearing springs 356 may be structurally located between the bearing clamp 326 and the base 322, for example, the leg portions 336, 356 of the base 322. Others of the bearing springs 356 may also be structurally located between heads of the fasteners 327 and the bearing clamp 326. Accordingly, the bearing springs 356 may be operably disposed between the base 322 and the bearing set 424 to yieldably bias the bearing set 424 into contact with the armature 328, wherein the armature 328 is yieldably biased with respect to the base 322.

Figure 12:
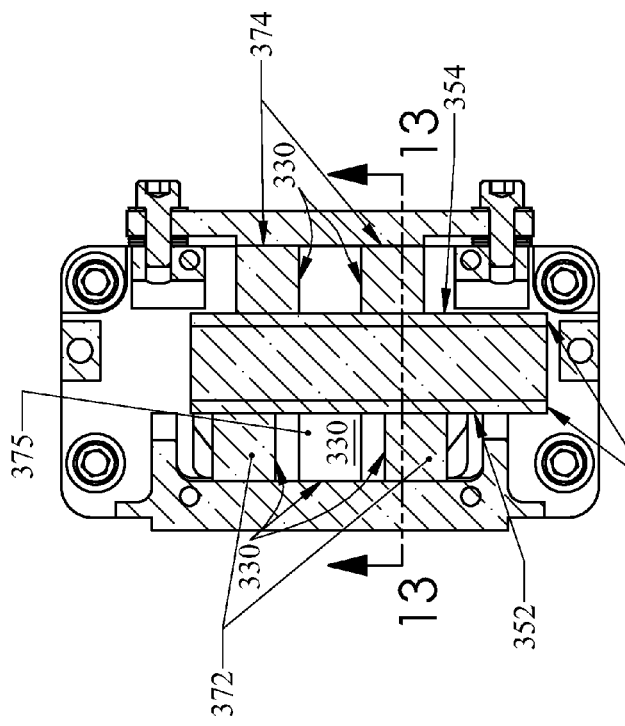
FIG. 12 is a cross-sectional plan view of the linear piezoelectric nano-positioner of FIG. 10 as taken along line 12-12.

The piezo sets 330 may be associated with the third and fourth surfaces 352, 354 of the armature 328 for moving the armature 328 axially along the base 322 in response to receiving an electric pulse or field. The piezo sets 330 may include a first pair of piezoelectric elements 372 associated with the third surface 352 and a second pair of piezoelectric elements 374 associated with the fourth surface 354. In one embodiment, the at least one other pair includes a trio including the pair of piezo elements 372 and a relatively centrally disposed fifth piezo element 375. In another embodiment, the second pair of piezo elements 374 is staggered with respect to the first pair of piezo elements 372. For example, the first pair of piezo elements 372 is spaced apart to a greater degree than the second pair of piezo elements 374 such that the first pair 372 is disposed longitudinally outboard of the second pair 374, as shown in FIG. 12. In another example, as shown in FIG. 13, the first pair of piezo elements 372 may be disposed a greater distance from a bottom of the base 322 compared to the second pair of piezo elements 374. In any event, the confronting surface areas of the piezo elements 372, 374 may overlap. In a further embodiment, the fifth piezo element 375 is staggered with respect to the second pair of piezo elements 374. For example, the fifth piezo element 375 is spaced from the second pair of piezo elements 374 in a direction perpendicular to the longitudinal axis A and toward the base 322. The spacing of the fifth piezo element 375 relative to the second pair of piezo elements 374 may be such that there is at least some overlap between the elements 374, 375 along the direction of spacing of the elements. In any event, as best shown in FIG. 13, the third surface 352 of the armature 328 may be relatively wider or greater in height than the fourth surface 354 of the armature 328 to accommodate the spaced apart fifth element 375. Such staggering of the piezo elements 330 may provide increased stability and rigidity of the nano-positioner 316.

The piezo clamp 376 may have opposing end portions coupled to the third and fourth leg portions 342, 344 of the base 322 in any suitable manner, for example, by fastening, welding, staking, etc. In one exemplary embodiment, the piezo clamp 376 may be fastened to the base 322 with fasteners 377, for instance, socket head cap screws as shown in the figures, or by bolts, or any other suitable fastening components. The piezo clamp 376 instead may be attached to other suitable portions of the base 322 as desired. Some of the piezo springs 378 may be structurally located between the piezo clamp 376 and the base 322, for example, the leg portions 342, 344 of the base 322. Others of the piezo springs 378 may also be structurally located between heads of the fasteners 377 and the piezo clamp 376. Accordingly, the piezo springs 378 may be operably disposed between the base 322 and the piezoelectric elements 330 to bias the elements 330 into contact with the armature 328 and, thus, yieldably bias the armature 328 with respect to the base 322. In another embodiment, the linear piezoelectric nano-positioner 316 may not include the piezo clamp 376 and any other suitable support structures can secure the armature 328 to the base 322. The second pair of piezo elements 374 may be associated with the armature 328 using any suitable mounting configuration, and may be adhered to, fastened to, or otherwise carried by the piezo clamp 376 in any suitable manner.

The quantities and qualities of the springs 356, 378 on either sides of the clamps 326, 376 may be varied depending on a range of force desired and to provide adjustment in yieldable bias force applied by the springs 356, 378. Also, the desired force may be adjusted by tightening the fasteners 327, 377 more or less, for example, to pre-load the springs 356, 378. In embodiments where the springs 356, 378 are placed on both sides of their respective clamps 326, 376, differentials in spring force across the clamps 326, 376 establish net spring forces applied to the bearing set 424 and/or piezoelectric elements 330. In the illustrated embodiment, the springs 356, 378 include spring washers. For example, the springs 356, 378 may be Belleville washers, slotted spring washers, or any other suitable type of spring washers.

Figure 15:
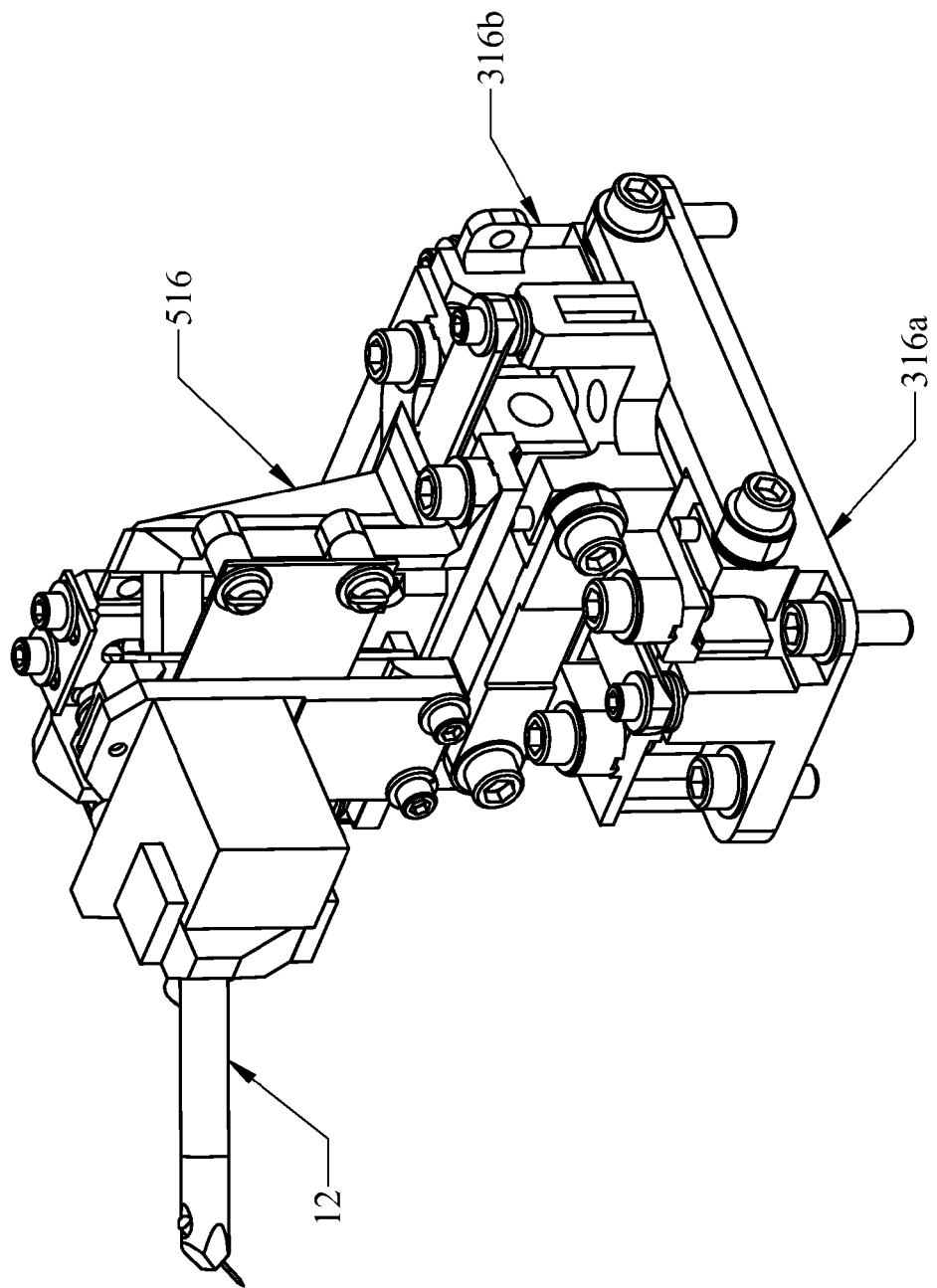
FIG. 15 is a perspective view of a multi-axis piezoelectric system for a microscope according to another exemplary embodiment.

FIG. 15 illustrates another exemplary embodiment of a multi-axis piezoelectric system 514. This embodiment is similar in many respects to the embodiment of FIG. 1 and like numerals between the embodiments generally designate like or corresponding elements throughout the several views of the drawing figures. Additionally, the descriptions of the embodiments are incorporated by reference into one another and the common subject matter generally may not be repeated here.

The system 514 includes first, second and third piezoelectric devices that may be linear piezoelectric nano-positioners 316a, 316b, 516 operably associated to each other for moving a probe (not shown) or any other device along respective X, Y, and Z axes. The linear piezoelectric nano-positioner 516 may be a conventional type of nano-positioner. Also, a separate bracket is not required between the Z axis positioner 516 and the Y axis positioner 316b. The multi-axis piezoelectric system 514 is particularly compact and rigid.

In general, the components of the nano-positioners 16, 116, 216, 316, 316a, 316b, 516 may be manufactured according to techniques known to those skilled in the art, including molding, machining, stamping, and/or any other suitable techniques. In one exemplary embodiment, the bases, clamps, and armatures may be machined from a solid block of material, for example, titanium. Other components, such as the bearing components, fasteners, springs, set screws, and the like may be obtained from Small Parts, Inc. of Miramar, Fla. Furthermore, the nano-positioners may be assembled according to known techniques.

Also, any suitable materials may be used in making the components, such as metals, composites, polymeric materials, and the like. Such materials may be selected based on their dimensional stability and non-magnetic properties, particularly in cold, ultra high vacuum SPM analysis environments. Example materials include titanium for the bases, titanium or stainless steel for the fasteners and washers/springs, beryllium copper for springs, sapphire or ceramic for stick-slip surfaces, tungsten carbide for bearing components, and sapphire, ceramic, or titanium for rolling or bearing surfaces.

One or more of the exemplary embodiments disclosed above may provide a relatively compact assembly including piezoelectric nano-positioners that are separate for each of three X, Y, and Z machine axes but are stackable and may be configured for a single location on a machine. Also, one or more of the exemplary embodiments disclosed above provide a piezoelectric nano-positioner that has increased rigidity and resonant frequency compared to prior art piezo nano-positioners. Accordingly, compared to prior devices, the provided piezoelectric nano-positioners may operate faster, more accurately and reliably, and may be non-magnetic.

As used in the sections above and claims below, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components, elements, or items. Similarly, when introducing elements of the invention or the example embodiments thereof, the articles "a," "an," "the," and "said" are intended to mean that there are one or more of the elements. Other terms are to be construed using their broadest reasonable meaning unless they are used in a context that requires a different interpretation.

Finally, the foregoing description is not a definition of the invention, but is a description of one or more examples of presently preferred embodiments of the invention. The statements contained in the foregoing description relate to the particular examples and are not to be construed as limitations on the scope of the invention as claimed below or on the definition of terminology used in the claims, except where terminology is expressly defined above. And although the present invention has been disclosed using a limited number of examples, many other examples are possible and it is not intended herein to mention all of the possible manifestations of the invention. In fact, other modifications, variations, forms, ramifications, substitutions, and/or equivalents will become apparent to those skilled in the art in view of the foregoing description. The present invention is intended to embrace such forms, ramifications, modifications, variations, substitutions, and/or equivalents as fall within the spirit and broad scope of the following claims. In other words, the present invention encompasses many substitutions or equivalents of limitations recited in the following claims. For example, the materials, sizes, and shapes, described above could be readily modified or substituted with other similar materials, sizes, shapes, and the like. Therefore, the invention is not limited to the particular examples of presently preferred embodiments disclosed herein, but instead is defined solely by the claims below.

The invention claimed is:

1. A linear piezoelectric nano-positioner, comprising:
   a base;
   an armature configured to be translated with respect to the base along a longitudinal axis;
   a first bearing set disposed between the base and the armature to translatably support the armature with respect to the base;
   a bearing clamp coupled to the base to movably secure the armature and the first bearing set with respect to the base;
   a second bearing set disposed between the bearing clamp and the armature to translatably support the armature with respect to the bearing clamp and being movably secured with respect to the base by the bearing clamp;
   at least one bearing spring to yieldably bias at least one of the first or second bearing sets against the armature in a first bias direction;
   a first set of piezoelectric elements disposed between the base and the armature to translate the armature with respect to the base;
   a piezo clamp coupled to the base to movably secure the armature and the first set of piezoelectric elements with respect to the base; and
   a second set of piezoelectric elements disposed between the piezo clamp and the armature to translate the armature with respect to the base and being movably secured with respect to the base by the piezo clamp.

2. The linear piezoelectric nano-positioner of claim 1, further comprising at least one piezo spring to yieldably bias at least one of the first or second sets of piezoelectric elements with respect to the armature in a second bias direction.

3. The linear piezoelectric nano-positioner of claim 2, wherein the first and second sets of piezoelectric elements are oriented orthogonally with respect to the first and second bearing sets, such that the armature has a first surface and a second surface oppositely-disposed with respect to the first surface, wherein the first and second surfaces are engaged with the first and second bearing sets, respectively, for supporting the armature axially along the base, the armature further having a third surface and a fourth surface oppositely-disposed with respect to the third surface and orthogonal to the first and second surfaces, wherein the third and fourth surfaces are engaged with the first and second sets of piezoelectric elements.

4. The linear piezoelectric nano-positioner of claim 1, wherein the first bearing set includes a frame and at least one roller element, the frame having at least one aperture, and the at least one roller element being disposed within the at least one aperture for supporting the armature.

5. The linear piezoelectric nano-positioner of claim 4, wherein the frame of the first bearing set includes a retainer having the at least one aperture for receiving the at least one roller element.

6. The linear piezoelectric nano-positioner of claim 5, wherein the at least one roller element has a cross-sectional thickness, the retainer having a height that is less than the cross-sectional thickness of the at least one roller element so that the at least one roller element extends through the at least one aperture of the retainer for supporting the armature.

7. The linear piezoelectric nano-positioner of claim 4, wherein the first bearing set further includes a linear guide including a V-shaped channel to cooperate with the at least one roller element.

8. The linear piezoelectric nano-positioner of claim 4, wherein the second bearing set includes a second frame and at least one second roller element, the second frame having at least one second aperture, the at least one second roller element being disposed within the at least one second aperture for supporting the armature.

9. The linear piezoelectric nano-positioner of claim 8, wherein the frame of the first bearing set includes a retainer having the at least one aperture for receiving the at least one roller element, and wherein the second frame of the second bearing set includes a second retainer having the at least one second aperture for receiving the at least one second roller element.

10. The linear piezoelectric nano-positioner of claim 8, wherein the armature includes a linear guide including a V-shaped channel to cooperate with the at least one second roller element.

11. The linear piezoelectric nano-positioner of claim 1, wherein the base includes a bearing pocket to receive the first bearing set.

12. The linear piezoelectric nano-positioner of claim 11, wherein the bearing clamp includes a second bearing pocket to receive the second bearing set.

13. The linear piezoelectric nano-positioner of claim 1, wherein the at least one bearing spring is disposed between the base and the first bearing set.

14. The linear piezoelectric nano-positioner of claim 1, wherein the at least one bearing spring is disposed between the bearing clamp and the second bearing set.

15. The linear piezoelectric nano-positioner of claim 1, wherein the base includes a seat section, a first leg portion extending from one end of the seat section, and a second leg portion extending from another end of the seat section, and wherein the bearing clamp is coupled to the first and second leg portions.

16. The linear piezoelectric nano-positioner of claim 1, wherein the base includes a seat section, a clamp flange extending from one side of the seat section, a third leg portion extending from one end of another side of the seat section, and a fourth leg portion extending from another end of the other side of the seat section, and wherein the piezo clamp is coupled to the third and fourth leg portions.

17. The linear piezoelectric nano-positioner of claim 2, wherein the at least one piezo spring is operably disposed between the piezo clamp and the second set of piezoelectric elements.

18. The linear piezoelectric nano-positioner of claim 1, wherein the first and second sets of piezoelectric elements each include first and second pairs of piezoelectric elements disposed on oppositely-disposed surfaces of the armature.

19. The linear piezoelectric nano-positioner of claim 1, wherein the first and second pairs of piezoelectric elements are spaced apart and aligned along spaced apart axes transverse to the longitudinal axis.

20. The linear piezoelectric nano-positioner of claim 1, wherein the first pair of piezoelectric elements is spaced apart to a greater degree than the second pair of piezoelectric elements such that the first pair of piezoelectric elements is disposed outboard of the second pair of piezoelectric elements.

21. The linear piezoelectric nano-positioner of claim 20, wherein the first set of piezoelectric elements also includes a fifth piezoelectric element disposed between the first pair of piezoelectric elements along the longitudinal axis and spaced from the first pair of piezoelectric elements in a direction perpendicular to the longitudinal axis.

22. The linear piezoelectric nano-positioner of claim 1, further comprising a mounting plate coupled to the armature, wherein the mounting plate includes an aperture to receive the second bearing set therethrough.

23. The linear piezoelectric nano-positioner of claim 1, wherein the armature includes an elongated member portion and a mounting plate portion integral with the elongated member portion.

24. The linear piezoelectric nano-positioner of claim 1, wherein the bearing clamp is fastened to the base with fasteners and the at least one bearing spring includes Belleville washers disposed between heads of the fasteners and the bearing clamp.

25. The linear piezoelectric nano-positioner of claim 24, wherein the at least one bearing spring also includes Belleville washers disposed between the bearing clamp and the base, wherein differentials in spring force applied by the Belleville washers across the clamps establish net spring forces applied to the second bearing set.

26. The linear piezoelectric nano-positioner of claim 2, wherein the piezo clamp is fastened to the base with fasteners and the at least one piezo spring includes Belleville washers disposed between heads of the fasteners and the piezo clamp.

27. The linear piezoelectric nano-positioner of claim 26, wherein the at least one piezo spring also includes Belleville washers disposed between the piezo clamp and the base, wherein differentials in spring force applied by the Belleville washers across the clamp establishes net spring forces applied to the second set of piezoelectric elements.

28. A linear piezoelectric nano-positioner, comprising:
    an armature configured to be translated along a longitudinal axis and having oppositely-disposed bearing surfaces and oppositely-disposed piezo surfaces;
    bearing sets engaged with the bearing surfaces of the armature to translatably support the armature; and
    piezoelectric elements engaged with the piezo surfaces of the armature to translate the armature along the longitudinal axis.

29. The linear piezoelectric nano-positioner of claim 28 further comprising:
    a base wherein the armature is translatable with respect to the base along a longitudinal axis;

a bearing clamp to secure the armature to the base in a first direction;

a piezo clamp to secure the armature to the base in a second direction orthogonal to the first direction;

bearing springs operably disposed between the base and the armature to yieldably bias the armature with respect to the base; and piezo springs operably disposed between the base and the armature to yieldably bias the armature with respect to the base.

30. The linear piezoelectric nano-positioner of claim 29 wherein the bearing clamp is fastened to the base with fasteners and the bearing springs include Belleville washers disposed between heads of the fasteners and the bearing clamp and between the bearing clamp and the base, and wherein the piezo clamp is fastened to the base with fasteners and the piezo springs include Belleville washers disposed between heads of the fasteners and the piezo clamp and between the piezo clamp and the base.

31. A linear piezoelectric nano-positioner, comprising:

a base including a seat section having a bearing pocket, a first leg portion extending from one end of the seat section, a second leg portion extending from another end of the seat section, a clamp flange extending from one side of the seat section, a third leg portion extending from one end of another side of the seat section, and a fourth leg portion extending from another end of the other side of the seat section;

an armature configured to be translated with respect to the base along a longitudinal axis, and having a first surface, a second surface oppositely-disposed with respect to the first surface, a third surface, and a fourth surface oppositely-disposed with respect to the third surface and orthogonal to the first and second surfaces;

a first bearing set disposed in the bearing pocket of the base and in engagement with the first surface of the armature to translatably support the armature with respect to the base;

a bearing clamp coupled to the first and second leg portions of the base to movably secure the armature and the first bearing set with respect to the base;

a second bearing set disposed between the bearing clamp and in engagement with the second surface of the armature to translatably support the armature with respect to the bearing clamp, and being movably secured with respect to the base by the bearing clamp;

at least one bearing spring to yieldably bias at least one of the first or second bearing sets against the armature in a first bias direction;

a first set of piezoelectric elements disposed between the clamp flange of the base and the third surface of the armature to translate the armature with respect to the base;

a piezo clamp coupled to the third and fourth leg portions of the base to movably secure the armature and the first set of piezoelectric elements with respect to the base; and a second set of piezoelectric elements disposed between the piezo clamp and the fourth surface of the armature to translate the armature with respect to the base and being movably secured with respect to the base by the piezo clamp.

32. A multi-axis piezoelectric system, comprising:

a first linear piezoelectric nano-positioner to move along a first longitudinal axis;

a second linear piezoelectric nano-positioner coupled to the first linear piezoelectric nano-positioner to move along a second longitudinal axis offset with respect to the first longitudinal axis;

wherein each of the first and second linear piezoelectric nano-positioners includes:

an armature configured to be translated along a longitudinal axis and having oppositely-disposed bearing surfaces and oppositely-disposed piezo surfaces;

bearing sets engaged with the bearing surfaces of the armature to translatably support the armature; and piezoelectric elements engaged with the piezo surfaces of the armature to translate the armature along the longitudinal axis.

33. The multi-axis piezoelectric system of claim 32, further comprising a third linear piezoelectric nano-positioner coupled to the second linear piezoelectric nano-positioner to move along a third longitudinal axis offset from the first and second longitudinal axes.

34. The multi-axis piezoelectric system of claim 33, further comprising a bracket coupled between the second and third linear piezoelectric nano-positioners.

* * * * *